US006472199B1

(12) United States Patent
Monken

(10) Patent No.: US 6,472,199 B1
(45) Date of Patent: Oct. 29, 2002

(54) METHOD OF CLEANING DAIRY PIPELINES USING ENZYME PRETREATMENT

(75) Inventor: Alan R. Monken, Overland Park, KS (US)

(73) Assignee: West Agro, Inc., Kansas City, MO (US)

( * ) Notice: Subject to any disclaimer, the term of this patent is extended or adjusted under 35 U.S.C. 154(b) by 0 days.

(21) Appl. No.: 09/825,749

(22) Filed: Apr. 4, 2001

(51) Int. Cl.[7] .................................................. C12S 9/00

(52) U.S. Cl. ....................... 435/264; 435/219; 510/218; 510/234; 510/392; 134/26

(58) Field of Search ................................ 435/188, 198, 435/219, 264; 510/111, 218, 234, 392, 530; 134/26, 27, 28, 29

(56) References Cited

U.S. PATENT DOCUMENTS

| | | | | | |
|---|---|---|---|---|---|
| 3,472,783 | A | * | 10/1969 | Smillie | 510/278 |
| 4,169,817 | A | * | 10/1979 | Weber | 510/108 |
| 4,212,761 | A | | 7/1980 | Ciaccio | |
| 4,243,543 | A | | 1/1981 | Guibert et al. | |
| 5,064,561 | A | | 11/1991 | Rouillard | |
| 5,489,531 | A | | 2/1996 | Benson | |
| 5,510,052 | A | | 4/1996 | McCandlish | |
| 5,783,542 | A | | 7/1998 | Rouillard | |
| 5,858,117 | A | | 1/1999 | Oakes et al. | |
| 5,861,366 | A | | 1/1999 | Ihns et al. | |
| 5,998,358 | A | * | 12/1999 | Herdt et al. | 510/197 |
| 6,071,356 | A | | 6/2000 | Olsen | |

FOREIGN PATENT DOCUMENTS

WO WO-97/02753 A1 * 1/1997

* cited by examiner

*Primary Examiner*—William H. Beisner
(74) *Attorney, Agent, or Firm*—Hovey Williams LLP

(57) ABSTRACT

Improved, non-chlorinated systems and methods for removing soils from hard surfaces are provided wherein such surfaces are initially contacted with a first aqueous use dispersion including a protease enzyme, followed by contact the surface with a second aqueous acidic use dispersion. The enzyme dispersion preferably includes a polyol such as propylene glycol and in use is heated to a temperature up to about 120° C. The acid dispersion may include a surfactant and is also used in a heated condition. The two-component systems of the invention can be used for CIP treatment of dairy or other equipment in lieu chlorinated cleaning agents.

46 Claims, No Drawings

METHOD OF CLEANING DAIRY PIPELINES USING ENZYME PRETREATMENT

BACKGROUND OF THE INVENTION

1. Field of the Invention

The present invention is broadly concerned with improved, two-component systems and methods for removing proteinaceous soils from surfaces, including an enzymatic prewash and an acidic secondary wash. More particularly, the invention is concerned with such systems and methods which are especially suited for clean-in-place (CIP) treatment of dairy equipment subject to milk-borne contamination, wherein the initial prewash includes a protease enzyme, preferably in combination with a polyol, whereas the secondary acid wash includes an acid, advantageously combined with a surfactant.

2. Description of the Prior Art

During dairy processing of milk, heat sterilization is performed in order to prevent microbial contamination. However, this inevitably causes deposition of milk-borne proteinaceous materials onto the surfaces of the dairy equipment. Such proteinaceous soils are extremely tenacious and are difficult to remove without a combination of a strong oxidizer combined with high levels of alkalinity for fat removal. The most common oxidizers in use today are chlorine-based materials. However, chlorine oxidizers present environmental problems, and there is an ongoing effort to find substitute, non-chlorinated cleaning agents which match or exceed the cleaning power of the chlorinated materials while avoiding the adverse environmental impact thereof.

Most dairies employ the CIP method, involving flushing of contaminated equipment surfaces with cleaning solution (s). For example, in conventional practice, the equipment is rinsed with lukewarm (110–120° F.) water followed by a hot was using a chlorinated agent at 160–175° C. The last step is commonly a cold acidic rinse using a phosphoric acid-based wash. The necessary tanks, pumps and control hardware for CIP processes are thus presently in place in the dairies. It is therefore highly desirable that any new cleaning system or method be usable in a CIP context without the need for any significant modifications of the in-place equipment.

A number of researchers have examined the utility of enzyme treatments as primary cleaning products, see e.g., U.S. Pat. Nos. 4,212,761, 5,858,117, 4,243,543, 5,510,052, 5,783,542,5,489,531,6,071,356 and 5,861,366. However, these references do not deal with commercial methods and systems where an enzymatic treatment is followed by an acid wash.

SUMMARY OF THE INVENTION

The present invention overcomes the problems outlined above and provides cleaning methods and systems especially designed for the removal of proteinaceous soils from surfaces. The invention finds particular utility in the CIP treatment of dairy equipment in lieu of conventional chlorinated cleansers. Broadly speaking the method of invention involves initially contacting soiled surfaces with a first aqueous use dispersion including a protease enzyme and preferably (but not necessarily) a polyol therein. After such initial treatment, the surface is thereafter contacted with a second aqueous use dispersion including an acid such as phosphoric acid; the second use dispersion preferably includes a surfactant therein.

The initial and second contacting steps are advantageously carried out for a period of from about 2–15 minutes, more preferably from about 5–10 minutes. Normally, both of the use dispersions are heated to a level above ambient, although this is not essential. In practice, both of the dispersions are simply circulated for contact with soiled surfaces; for example, in CIP cleaning, the use dispersions are circulated in a manner essentially identical with the conventional practice.

Dispersions in accordance with the invention (as used herein, "dispersions" refers to any type of aqueous mixture, be it a true solution, a colloid, an emulsion or a dispersion) are typically provided in the form of concentrates which can be diluted on-site at the time of use. Moreover, the enzyme prewash and acid wash components are preferably provided to the consumer as a system designed to operate in tandem for the most efficient cleaning.

DETAILED DESCRIPTION OF THE PREFERRED EMBODIMENT

The following example sets forth preferred enzyme prewash/acid wash systems and treatments in accordance with the invention. It is to be understood, however, that this example is provided by way of illustration and nothing therein should be taken as a limitation upon the overall scope of the invention.

EXAMPLE

In this series of tests, dual phase enzyme prewash/acid wash trials were conducted using a commercially available enzyme formulation with different acids. In these tests, the following apparatus was employed: three 1 L beaker, stirring bars, 50 or 100 ml graduated cylinder, hot plate/stirrer, analytical balance weighing to the nearest 0.1 mg, laboratory oven thermostatted to 100–110° C., laboratory oven thermostatted to 40° C., 304 SS or glass panels measuring 3"×6"×0.037", having a ¼" hole in one end.

The reagents used were xylene, isopropanol, one 12 oz. can evaporated milk, AOAC synthetic hard water (25 grains/gal. hardness), and analytical water. One enzyme formulation contained 20% by weight Purafect 4000L protease enzyme (Genecor, Inc.), 10% by weight propylene glycol USP, and 70% by weight low conductivity water. Other enzymes formulations used were experimental enzymes A, B and C made up of (where all percentages are by weight): A—Esperase 8.OL, 10%, Lipase 1 OOL, 10%, propylene glycol, 10%, water, 70%; B—Savinase 16.OL, 12%, Lipase 1 OOL, 6%, propylene glycol, 10%, water, 72%; and C—Savinase 16.01L, 5%, Lipase IOOL, 10%, propylene glycol, 10%, water, 75%. All of the commercial protease enzyme products (Esperase, Lipase, Savinase) are available fromNovoNordiskofKrogshojvej, Denmark. The acids used were commercially available preparations, namely (1) containing 22.67% by weight 75% phosphoric acid,0.4% by weight Ampholac YJH40 surfactant (sodium alkylimino dipropionate, CAS #94441-92-6 sold by Berol Nobel), 6.25% by weight 96% sulfuric acid and 70.68% by weight water; (2) containing 24.0% by weight 75% phosphoric acid, 0.5% by weight Ampholac YJH40 surfactant, 10% by weight 96% sulfuric acid and 65.5% by weight water; (3) an acid sanitizer sold by West Agro, Inc; and Unipred, a phosphoric acid-based acid cleaner commercialized by Aurhusegnens. In addition, control tests were carried out using a two-part commercially available alkaline chlorinated cleanser at recommended use levels.

The test panels are first cleaned by wiping with xylene, then with isopropanol, followed by drying in an oven (100–110° C. for 10–15 minutes) to insure complete evaporation of the solvent. The panels were suspended in the oven by attaching a rigid wire hanger to the panel hole, so that no contact is made with the oven or other items within the oven. The dried panels were then removed from the oven and allowed to cool a minimum of 20 minutes. The panels were then carefully handled so as to eliminate contact with soil sources, and the initial weight of each panel was recorded to the nearest 0.1 mg.

The evaporated milk was then emptied into the 1 L beaker along with an equivalent volume of analytical water, and the mixture was stirred to insure homogeneity. Up to three panels are placed in the milk by setting the end without the hole on the bottom of the beaker and propping the other end of the panel against the side of the beaker. Approximately ¾ of the panel should be immersed in the milk. The panels are allowed to sit in the milk for 15 minutes. After the set period, the panels were removed from the milk and drained in air for 5 minutes. Each panel side is then rinsed with 50 ml of 25 grains AOAC synthetic hard water previously heated to 90–100° F. Care is taken to pour the rinse water over each side of the panel so as to contact all of the soiled areas with rinsed water. The rinse water is allowed to drain off each panel and then the panels are then hung in the 40° C. oven to dry the panels. The panels are then removed from the oven and allowed to cool for at least 15 minutes. After cooling, the panels are weighed and each weight is recorded to the nearest 0.1 mg. The soil deposition, rinsing, drying and weighing cycle is carried out a total of five times for each panel, or until the soil weight falls within the range of 10–15 mg.

The soiled panels were then cleaned using the enzyme prewash/acid wash process of the invention. For this purpose, a 1 L beaker was used for each of the prewash and acid wash. Specifically, for the prewash, 800 ml 25 grain AOAC synthetic hard water was placed in the beaker along with a specified percent by volume of the enzyme boost was added. Similarly, for the acid wash, 800 ml of the synthetic hard water was placed in the other beaker along with a specified percent by volume of the acid product. Both the prewash and acid wash solutions were heated using the hot plate to a temperature of 40° C., unless otherwise specified.

Each test panel was first immersed in the enzyme prewash for a period of 8 minutes with agitation via a stir bar. After the prewash period, each panel was removed from the prewash and immediately immersed in the acid wash, without intermediate rinsing. The panel remained in the acid wash during stirring with a stir bar for an additional 8 minute period.

Next, each panel is removed from the acid wash solution, and is rinsed in tap water for about 5 seconds. The panel is then suspended within the 40° C. oven for a period of about 15 minutes to dryness. The panel is removed from the oven, cooled in air for about 30 minutes and then reweighed. The weight of the panel after the enzyme prewash/acid wash cycle was then compared with the soiled weight thereof to determine the percent soil removed. Each of the enzyme and acid test solutions were tested in triplicate and the results were averaged.

In certain cases as a comparison, the soiled panels were treated only with an acid treatment, in the manner set forth above. As a further comparison, other panels were treated only with the above-identified two-part alkaline chlorinated cleanser.

The following table sets forth the results of these trials.

TABLE 1

| Prewash | Final Wash | Cleaning Efficiency |
|---|---|---|
| 0.05% enzyme formulation | 0.5 #1 | 84.2% |
| 0.05% enzyme formulation | 0.15 #3 | 89.9% |
| 0.05% enzyme formulation | 0.5 #2 | 80.0% |
| — | 0.5 #1 | 64.1% |
| 0.05% enzyme formulation | 0.5 Unipred | 92.9% |
| 0.05% enzyme formulation | 0.5 #2 | 102.8% |
| — | 0.3 Unipred | 83.7% |
| — | 0.5 Unipred | 71.9% |
| 0.05% enzyme formulation | 0.5 #2 | 74.2% |
| — | Two-part chlorinated alkaline cleanser | 94.1% |
| 0.05% Enzyme A | 0.5 #2 | 74.6% |
| 0.05% Enzyme B | 0.5 #2 | 65.5% |
| 0.05% Enzyme C | 0.5 #2 | 70.5% |
| — | Two-part chlorinated alkaline cleanser | 81.7% |

As illustrated by this data, use of the enzyme prewash in combination with the acid wash gives better cleaning results, as compared with the acid only treatment.

The acid cleaning systems and methods of the invention are not limited to the preferred embodiments described in this example. For example, a variety of other commercially available enzymes can be employed, such as Alcalase 2.5L, DX, Esperase 8.0L, Savinase 16.0L Type EX (all available from Novo Nordisk). In like manner., a wide variety of polyols can be used, e.g., alkylene glycol (such as propylene, hexylene or ethylene glycol), glycerine, sorbitol, mannitol and mixtures thereof.

In the case of the acid washes, suitable acids and presently preferred ranges of use in the dilutable concentrates (% by weight) include phosphoric (15–20%), sulfuric (8–12%), hydrochloric (5–12%), lactic (2–15%), octanoic (3–5%), citric (1–10%), hydroxyacetic (2–15%), sulfamic (3–75%), decanoic (3–5%), propionic (10–12%), nonanoic (3–5%) acids and mixtures thereof, with phosphoric, sulfuric and hydrochloric acids being preferred. Preferred surfactants are low-foaming acid soluble, although other types may be employed. Exemplary surfactants include sodium alkylimino dipropionate, alcohol ethoxylate, disodium octyl iminodipropionate, octyl iminodipropionate, deceth-4-phosphate, sodium alkyl ether sulfate, alkoxylated alcohols, and mixtures thereof.

The following table sets forth approximate broad and preferred ranges for the ingredients included in the concentrates and use dilutions of both the enzyme prewash and acid wash dispersions.

TABLE 2

| Ingredient | Broad Range | Preferred Range |
|---|---|---|
| Enzyme Prewash Dispersions Dilutable Concentrates | | |
| Protease enzyme | 4–100% | 8–30% |
| Polyol | 0–20% | 8–12% |
| Water | q.s. | q.s. |
| Surfactant | 0–5% | 1–3% |
| Use Dilutions | | |
| Protease Enzyme | 0.002–0.5% | 0.004–0.015% |
| Polyol | 0–0.01% | 0.004–0.006% |
| Water | q.s. | q.s. |
| Surfactant | 0–0.0025 | 0.0005–0.0015 |

TABLE 2-continued

| Ingredient | Broad Range | Preferred Range |
|---|---|---|
| Acid Wash Dispersions Dilutable Concentrates | | |
| Acid | 1–75% | 3–30% |
| Surfactant | 0–2% | 0.3–1% |
| Water | q.s. | q.s. |
| pH | 0.5–3 | 1–2 |
| Use Dilutions | | |
| Acid | 0.0005–0.0375% | 0.0015–0.015% |
| Surfactant | 0–0.001% | 0.00015–0.0005% |
| Water | q.s. | q.s. |
| pH | 1–4 | 2–4 |

During cleaning operations, both the initial enzyme prewash use dispersion and the second acid use dispersion should be used in a manner so as to insure contact between each of the use dispersions and the soiled surfaces for a period of from about 1–15 minutes, and more preferably from about 5–10 minutes. Both the enzyme prewash use dispersion and the acid use dispersion are preferably used at a temperature of from about ambient to 120° C., and more preferably from about 30–60° C.

In actual practice, the two primary steps involving the enzyme prewash and acid wash can be varied to include other steps. For example, where chlorinated cleansers are usable, a chlorine treatment can be employed between the prewash and acid washes of the invention. Furthermore, a cold water rinse may be utilized after the acid wash treatment of the invention.

Although the invention finds particular utility for CIP treatment of dairy equipment, it is not so limited. To give but a few examples, the systems and methods hereof can be used to clean a broad array of equipment such as heat exchangers, tanks, pipes, centrifuges, evaporators, filters, extruders, coders, coolers, sieves, hydrocyclones, ultra-, hyper-, micro- and nanofiltration units.

I claim:

1. A method of removing soils including proteinaceous and fat contaminants from a surface comprising the steps of:

initially contacting said surface with a first aqueous use dispersion including an enzyme fraction, said enzyme fraction consisting essentially of a protease enzyme; and thereafter contacting said surface with a second aqueous use dispersion including an acid and a surfactant.

2. The method of claim 1, said initial contacting step being carried out for a period of from about 2–15 minutes.

3. The method of claim 2, said period being from about 5–10 minutes.

4. The method of claim 1, said first dispersion also including a polyol.

5. The method of claim 4, said polyol selected from the group consisting of an alkylene glycol, glycerine, sorbitol, mannitol and mixtures thereof.

6. The method of claim 4. said polyol being present at a level of from about 0–0.01% by weight.

7. The method of claim 1, said protease enzyme being present at a level of from about 0.002–0.5% by weight.

8. The method of claim 1, said acid being selected from the group consisting of phosphoric, sulfuric, hydrochloric, lactic, octanoic, citric, hydroxyacetic, sulfamic, decanoic, propionic, nonanoic acids and mixtures thereof.

9. The method of claim 8, said acid being present at a level of from about 0.0005–0.0375% by weight.

10. The method of claim 1, said second contacting step being carried out for a period of from about 2–15 minutes.

11. The method of claim 1, said first aqueous use dispersion including a surfactant.

12. A method of removing soils including proteinaceous and fat contaminants from a surface comprising the steps of:

initially contacting said surface with a first aqueous use dispersion including an enzyme fraction, said enzyme fraction consisting essentially of a protease enzyme; and thereafter contacting said surface with a second aqueous use dispersion including an acid selected from the group consisting of phosphoric, sulfuric, lactic, octanoic, hydrochloric, citric, hydroxyacetic, sulfamic, decanoic, propionic, nonanoic acids and mixtures thereof.

13. The method of claim 12, said initial contacting step being carried out for a period of from about 2–15 minutes.

14. The method of claim 13, said period being from about 5–10 minutes.

15. The method of claim 12, said first dispersion also including a polyol.

16. The method of claim 15, said polyol selected from the group consisting of an alkylene glycol, glycerine, sorbitol, mannitol and mixtures thereof.

17. The method of claim 15, said polyol being present at a level of from about 0–0.01% by weight.

18. The method of claim 12 said protease enzyme being present at a level of from about 0.002–0.5% by weight.

19. The method of claim 12, said acid being present at a level of from about 0.0005–0.0375% by weight.

20. The method of claim 12, said second contacting step being carried out for a period of from about 2–15 minutes.

21. A system for removing soils including proteinaceous and fat contaminants from a surface, said system comprising:

a first aqueous use dispersion including an enzyme fraction, said enzyme fraction consisting essentially of a protease enzyme; and a second aqueous use dispersion including an acid and a surfactant.

22. The system of claim 21, said first dispersion also including a polyol.

23. The system of claim 22, said polyol selected from the group consisting of an alkylene glycol, glycerine, sorbitol, mannitol and mixtures thereof.

24. The system of claim 23, said polyol being present at a level of from about 0–0.01% by weight.

25. The system of claim 21, said protease enzyme being present at a level of from about 0.002–0.5% by weight.

26. The system of claim 21, said acid being selected from the group consisting of phosphoric, sulfuric, hydrochloric, citric, lactic, octanoic, hydroxyacetic, sulfamic, decanoic, propionic, nonanoic acids-and mixtures thereof.

27. The system of claim 26, said acid being present at a level of from about 0.0005–0.0375% by weight.

28. The system of claim 21, said first aqueous use dispersion including a surfactant.

29. A system for removing soils including proteinaceous and fat contaminants from a surface, said system comprising:

a first aqueous use dispersion including an enzyme fraction, said enzyme fraction consisting essentially of a protease enzyme; and a second aqueous use dispersion including an acid selected from the group consisting of phosphoric, sulfuric, lactic, octanoic, hydrochloric, citric, hydroxyacetic, sulfamic, decanoic, propionic, nonanoic acids and mixtures thereof.

30. The system of claim 29, said first dispersion also including a polyol.

31. The system of claim 30, said polyol selected from the group consisting of an alkylene glycol, glycerine, sorbitol, mannitol and mixtures thereof.

32. The system of claim 31, said polyol being present at a level of from about 0–0.01% by weight.

33. The system of claim 29, said protease enzyme being present at a level of from about 0.002–0.5% by weight.

34. The system of claim 29, said acid being present at a level of from about 0.0005–0.0375% by weight.

35. A system for removing soils including proteinaceous and fat contaminants from a surface, said system comprising:

a first aqueous dilutable concentrate dispersion including an enzyme fraction, said enzyme fraction consisting essentially of a protease enzyme; and a second aqueous dilutable concentrate dispersion including an acid and a surfactant.

36. The system of claim 35, said first dispersion also including a polyol.

37. The system of claim 36, said polyol selected from the group consisting of an alkylene glycol, glycerine, sorbitol, mannitol and-mixtures thereof.

38. The system of claim 36, said polyol being present at a level of from about 5–20% by weight.

39. The system of claim 35, said protease enzyme being present at a level of from about 4–100% by weight.

40. The system of claim 35, said acid being selected from the group consisting of phosphoric, sulfuric, hydrochloric, citric, lactic, octanoic, hydroxyacetic, sulfamic, decanoic, propionic, nonanoic acids and mixtures thereof.

41. The system of claim 40, said acid being present at a level of from about 1–75% by weight.

42. A system for removing soils including proteinaceous and fat contamionants from a surface, said system comprising:

a first aqueous dilutable concentrate dispersion including an enzyme fraction, said enzyme fraction consisting essentially of a protease enzyme; and a second aqueous dilutable concentrate dispersion including an acid selected from the group consisting of phosphoric, sulfuric, hydrochloric, citric, hydroxyacetic, sulfamic, decanoic, propionic, nonanoic acids and mixtures thereof.

43. The system of claim 42, said first dispersion also including a polyol.

44. The system, of claim 43, said polyol selected from the group consisting of an alkylene glycol, glycerine, sorbitol, mannitol and mixtures thereof.

45. The system of claim 43, said polyol being present at a level of from about 5–20% by weight.

46. The system of claim 42, said acid being present at a level of from about 1–75% by weight.

* * * * *